United States Patent [19]

Hoffman

[11] Patent Number: 4,678,815

[45] Date of Patent: Jul. 7, 1987

[54] AQUEOUS SILICONE EMULSIONS AS BLADDER LUBRICANTS

[75] Inventor: Michael J. Hoffman, Clinton, Mich.

[73] Assignee: Stauffer-Wacker Silicones Corporation, Adrian, Mich.

[21] Appl. No.: 749,256

[22] Filed: Jun. 27, 1985

[51] Int. Cl.⁴ .......................... C08K 5/10; C08L 83/06
[52] U.S. Cl. .................... 523/122; 524/276; 524/285; 524/588
[58] Field of Search ............ 524/588, 276, 285; 523/122

[56] References Cited

U.S. PATENT DOCUMENTS

| | | | |
|---|---|---|---|
| 3,186,963 | 1/1965 | Lewis et al. | 260/46.5 |
| 3,713,851 | 1/1973 | Cekada, Jr. | 106/38.22 |
| 3,872,038 | 3/1975 | Adams et al. | 260/13 |
| 4,184,880 | 1/1980 | Huber et al. | 106/15.05 |
| 4,325,852 | 4/1982 | Hallenbeck | 524/276 |
| 4,359,340 | 11/1982 | Comper et al. | 106/38.22 |
| 4,431,452 | 2/1984 | Comper et al. | 106/38.22 |
| 4,436,856 | 3/1984 | Huhn et al. | 524/211 |

*Primary Examiner*—C. Warren Ivy

[57] ABSTRACT

An aqueous organopolysiloxane emulsion containing (1) hydroxyl-containing organopolysiloxanes, (2) organohydrogenpolysiloxanes, (3) a lubricant having a melting range of from 25° to 80° C., (4) a thickening agent, (5) a surfactant, and (6) water and an antifoam and bactericide, if desired, which may be used as a bladder lubricant for molding tires.

9 Claims, No Drawings

AQUEOUS SILICONE EMULSIONS AS BLADDER LUBRICANTS

The present invention relates to aqueous silicone emulsions and more particularly to aqueous organopolysiloxane emulsions which may be used as bladder lubricants.

BACKGROUND OF THE INVENTION

In manufacturing tires, the actual shaping of the tire is caused by inflating a rubber bag inside a green tire carcass to force the tire into shape within the mold. Generally, there is substantial movement between the outer contact surface of the bladder, and the inner surface of the green tire during the expansion phase of the bladder prior to fully curing the tire. Likewise, there is considerable relative movement between the outer contact surface of the bladder and the cured inner surface of the tire after the tire has been molded and vulcanized during the collapse and the stripping of the bladder from the tire.

It is essential that there be sufficient lubrication between the bladder and the inner surface of the tire in order to reduce friction between the bladder and the inside of the raw tire and allows for optimum slip of the bladder during the shaping process when the raw tire and bladder are in friction with one another. In addition, the lubricant also serves to channel the trapped air and/or gasses during high temperature curing. Finally, at the termination of the vulcanization cycle, the lubricant allows for the release and removal of the bladder from inside the tire.

Aqueous organopolysiloxane emulsions containing treated inorganic silicates have been used as lubricants for molding tires. These emulsions are described in, for example, U.S. Pat. No. 4,184,880 to Huber et al in which an aqueous diorganopolysiloxane emulsion containing dispersed inorganic silicates which have been treated with organosilicon compounds to impart hydrophobic properties to the surfaces of the inorganic silicates have been employed as release agents for manufacturing tires. Also, U.S. Pat. No. 3,713,851 to Cekada describes aqueous organopolysiloxane emulsions which have been used as bag lubricants for molding tires in which the emulsion contains an alkyl methyl siloxane fluid including non-flowing gums, polyalkylene glycols, mica, carboxymethylcellulose, lecithin and water. U.S. Pat. No. 4,431,452 to Comper et al discloses a lubricating composition for a tire bladder comprising (1) a hydroxyl-terminated polydimethylsiloxane having a viscosity of up to about 25,000,000 centistokes at 25° C., (2) a hydroxyl-terminated polydimethylsiloxane having a viscosity up to about 120,000 centistokes at 25° C., (3) a polyalkylene glycol, (4) bentonite clay and (5) a surfactant. U.S. Pat. No. 3,872,038 to Adams et al discloses an aqueous emulsion which is useful as a bladder lubricant comprising (1) a silicone gum, (2) an organopolysiloxane fluid, (3) polyglycols, (4) mica, (5) lecithin, (6) sodium carboxymethylcellulose, (7) emulsifying agents and (8) water.

A bladder lubricant is described in U.S. Pat. No. 4,359,340 to Comper et al in which an aqueous emulsion comprising (1) a polydimethylsiloxane having a viscosity up to about 25,000,000 centistokes at 25° C., (2) a methylhydrogen silane having a viscosity of from 20 to 40 centistokes at 25° C., or a dimethylhydrogen silane having a viscosity of from 80 to 120 centistokes at 25° C., (3) a metal salt of an organic acid and (4) surfactants is applied to the bladder surface.

An aqueous emulsion for treating organic fibers is described in U.S. Pat. No. 4,436,856 to Huhn et al in which the aqueous emulsion containing (1) an organopolysiloxane having at least two monovalent SiC-bonded organic radicals per molecule with a basic nitrogen atom, (2) an organopolysiloxane having at least 3 Si-bonded hydrogen atoms per molecule, (3) a catalyst for the condensation of Si-bonded condensable groups, (4) an emulsifier and (5) a diorganopolysiloxane containing an Si-bonded terminal hydroxyl group.

Aqueous organopolysiloxane emulsions employed heretofore as bladder lubricants in manufacturing tires have several disadvantages. For example, pre-formulated aqueous organopolysiloxane emulsions have stability problems in which the areas of ingredient settling, compaction and/or degradation during storage and/or during transportation, or upon inordinate changes such as freeze-thaw cycles that might be encountered.

In order to reduce the sliding friction and improve venting between the bladder and the inside of the tire, it has been necessary to increase the amount of filler or the amount of silicone polymer present in the composition and as the amount of filler increased, settling and compaction become a problem. In addition, many of the aqueous organopolysiloxane emulsions are not stable over long periods of time and have a tendency to "cream" and/or form an oil on the surface. Also, some of the organopolysiloxane emulsions contain catalysts which have a tendency to accelerate the degradation of the resultant emulsion and release hydrogen as a by-product. Furthermore, many of the aqueous organopolysiloxane emulsions have to be applied to the bladder just prior to shaping the tire, otherwise good lubricating properties and release properties are not achieved.

In contrast to the aqueous organopolysiloxane emulsions described heretofore, the aqueous organopolysiloxane emulsions of this invention are stable over long periods of time. Generally, the aqueous organopolysiloxane emulsions of this invention do not release hydrogen during storage. In addition, several tires can be manufactured with one application of the aqueous organopolysiloxane emulsions of this invention. Moreover, the aqueous organopolysiloxane emulsions of this invention can be applied to the inside of the green tire carcass and allowed to stand overnight without affecting the release properties. Furthermore, the inside of the green tire carcass can be coated with the aqueous organopolysiloxane emulsions away from the press area and then transferred to the press area where they are molded.

Therefore, it is an object of the present invention to provide an aqueous organopolysiloxane composition which may be used as a bladder lubricant. Another object of the present invention is to provide a composition which is stable over a long period of time. Another object of the present invention is to provide an aqueous organopolysiloxane emulsion which will give numerous releases per application. Still another object of the present invention is to provide an aqueous organopolysiloxane emulsion which may be applied to the inside of a green tire carcass several hours before the tire is molded. A further object of the present invention is to provide a method for preparing an aqueous organopolysiloxane emulsion. Still a further object of the present invention is to provide a method for molding tires using an aqueous organopolysiloxane emulsion.

SUMMARY OF THE INVENTION

The foregoing objects and others, which will become apparent from the following description are accomplished in accordance with this invention, generally speaking, by providing aqueous organopolysiloxane emulsions comprising (1) a hydroxylcontaining organopolysiloxane gum having a plasticity value of from 50 to 100, (2) an organohydrogenpolysiloxane having an average of at least 3 Si-bonded hydrogen atoms per molecule, (3) a lubricant having a melting range of from 25° to 80° C., (4) a thickening agent, (5) surfactant and (6) water. Other ingredients which may be added to the organopolysiloxane emulsions are antifoams and bactericides, if desired.

The aqueous organopolysiloxane emulsions are preferably prepared by mixing the surfactant with sufficient water and acid to form a paste; then the lubricant and hydroxyl-terminated organopolysiloxane gum is added to the paste with mixing and then the methylhydrogenpolysiloxane fluid is added with continual mixing. To the resultant mixture is then added the remainder of the water, antifoam, bactericide and sufficient ammonium hydroxide to increase the pH to a level of from 8 to 10. After mixing for a period of time, the thickening agent and sufficient acid is then added with agitation to reduce the pH to a range of from 4 to 6. After the emulsion has been thoroughly mixed it is then filtered.

DETAILED DESCRIPTION OF THE INVENTION

The hydroxyl-containing organopolysiloxane gum has an average unit formula $$R_nSiO_{(4-n)/2}$$

where R, which may be the same or different represent monovalent hydrocarbon radicals or halogenated monovalent hydrocarbon radicals having from 1 to 18 carbon atoms and n has an average value of from 1.9 to 2.1. In the above formula R represents alkyl radicals such as methyl, ethyl, propyl, butyl, octyl, dodecyl and octadecyl radicals; aryl radicals such as phenyl, diphenyl and naphthyl radicals; alkenyl radicals such as vinyl and allyl radicals; cycloalkyl radicals such as cyclobutyl, cyclopentyl and cyclohexyl radicals; alkaryl radicals such as tolyl, xylyl and ethylphenyl radicals; aralkyl radicals such as benzyl, alpha phenyl ethyl, beta phenylethyl and alpha phenylbutyl radicals and halo-substituted radicals described above.

The organopolysiloxane gum may be any linear or branched chain compound having an average of from 1.9 to 2.1 organic radicals per silicon atom. In addition to the unit shown above, the organopolysiloxane gum may also contain units which correspond to the following formulas $$SiO_{4/2}, RSiO_{3/2} \text{ and } R_3SiO_{\frac{1}{2}},$$

where R is the same as above. These organopolysiloxane gums can be either homopolymeric or copolymeric materials containing 2 or more different siloxane units and the organic radicals attached to any one silicon atom can be the same or the radicals attached to any one silicon atom can be different. Mixtures of polymers can, of course, also be used if desired. Preferably, at least 75 molar percent of the silicon atoms present in the organopolysiloxane gum are substituted with alkyl radicals, among which the methyl radicals are preferred. Other radicals which may be present are preferably vinyl and/or phenyl radicals. Generally, these gums will have an R/Si ratio of from about 1.9 to about 2.1 organic groups per silicon atom and a plasticity value of from 50 to about 100 millimeters as measured by the parallel plate plastometer test described in A.S.T.M. Test D-926-67.

The organohydrogenpolysiloxanes employed in the emulsions of this invention generally consist of units of the formula $$R'_mSiO_{4-m/2}$$

where R' represents hydrogen, a monovalent hydrocarbon radical or a halogenated monovalent hydrocarbon radical having from 1 to 18 carbon atoms in which at least 2 and preferably 3 Si-bonded hydrogen atoms are present per molecule and m is 1, 2 or 3. Preferred organohydrogenpolysiloxanes are those consisting of R'SiO units, R'$_2$SiO units and R'$_3$SiO$_{0.5}$ units in which R' is the same as above and an Si-bonded hydrogen atom is present for each 3 to 100 silicon atoms. It is preferred that the organohydrogenpolysiloxanes have a viscosity of from about 10 to 100 mPa.s and more preferably from about 30 to 80 mPa.s at 25° C.

The organohydrogenpolysiloxanes may also contain monovalent having aliphatic unsaturation as well as Si-bonded hydrogen atoms in the same molecule.

It is preferred that the monovalent hydrocarbon radicals represented by R' each contain from 1 to 18 carbon atoms. Examples of suitable hydrocarbon radicals are alkyl radicals such as the methyl, ethyl, n-propyl, isopropyl radicals as well as the octadecyl radicals; cycloalkyl radicals such as the cyclohexyl and cycloheptyl radicals; aryl radicals such as the phenyl radical; alkaryl radicals such as the tolyl radicals and arylalkyl radicals such as the benzyl and the beta phenylethyl radicals. Examples of substituted hydrocarbon radicals represented by R' are halogenated hydrocarbon radicals such as the 3,3-trifluoropropyl radical and the ortho-, para- and metachlorophenyl radicals. Because of their availability, it is preferred that at least 50 percent of the R' radicals which do not consist of Si-bonded hydrogen atoms be methyl radicals.

Examples of suitable lubricants which may be employed in the aqueous emulsions of this invention are waxes and esters of higher fatty acids, which have a melting range of from 25° to 80° C., and more preferably from about 30° to 70° C. Preferred examples of suitable fatty acid esters and waxes are lanolin, beeswax, spermaceti, Japan wax, bayberry, citrus peel oils, sugar cane wax, candelillia and synthetic waxes such as carbowax.

Examples of suitable surfactants which may be employed in the aqueous emulsions of this invention are anionic, cationic and nonionic surfactants such as alkyl or aryl polyglycol ethers or alkylphenyls such as polyoxyethylene alkyl phenyls, polyoxyethylene sorbitan hexastearate, polyoxyethylene isotridecyl ether, trimethylnonyl ether of polyethylene glycol containing from 6 to 15 ethylene oxide units per molecule, polyoxyethylene sorbitan oleate having a saponification number of from 102 to 108 and a hydroxyl number of from 25 to 35. It is preferred that a mixture of nonionic surfactants be employed such as a mixture of ethoxylated alkyl phenols having varying chain links.

Several thickening agents may be employed in the emulsions of this invention to aid in the stability of the emulsion. Examples of suitable thickening agents are magnesium aluminum silicate, water-soluble cellulose such as sodium carboxy methyl cellulose, sodium carboxymethyl hydroxy ethyl cellulose, hydroxy ethyl cellulose, methyl cellulose, methylhydroxy propyl cellulose, ethyl hydroxy ethyl cellulose, methylethyl cellulose, methyl hydroxy ethyl cellulose. The thickening agent imparts viscosity to the emulsion, and stabilizes the emulsion over a pH range of from 3 to 11 and keeps the internal phase droplets suspended and separated. It also reduces the tendency of diluted emulsions to thin or break at room temperature, as well as at elevated temperatures.

The aqueous organopolysiloxane emulsions of this invention preferably contain from about 20 to 70 percent by weight based on the weight of the emulsion of the hydroxylterminated organopolysiloxane gum and more preferably from about 30 to 55 percent by weight of hydroxyl-terminated organopolysiloxane gum. The amount of organohydrogenpolysiloxane fluid may range from about 0.5 up to about 25 percent by weight and more preferably from about 4 to about 10 percent by weight. It has been found that the ratio of organohydrogenpolysiloxane fluid to hydroxyl-terminated organopolysiloxane gum is critical and the higher the ratio the greater the number of releases per application. However, when the ratio exceeds about 25 percent by weight then there is a substantial decrease in the stability and the release properties of the resultant emulsion. The amount of lubricant may range from about 0.05 up to about 5 percent by weight and more preferably from about 0.3 up to about 1 percent by weight based on the total weight of the aqueous emulsion. Generally, the surfactant will range from about 4 to about 10 percent by weight and more preferably from about 5 to 9 percent by weight, based on the weight of the organopolysiloxane emulsion. It is preferred that two or more nonionic surfactants be employed in order to obtain optimum stability of the emulsion.

The amount of thickening agent employed in the aqueous organopolysiloxane emulsions may range from about 2 to 12 percent by weight and more preferably from about 4 to 8 percent, based on the weight of the aqueous organopolysiloxane emulsion. The amount of water will generally range from about 15 to about 60 percent by weight and more preferably from about 25 to 50 percent by weight and more preferably from about 30 to 35 percent by weight, based on the weight of the aqueous organopolysiloxane emulsion.

The lubricity of the aqueous emulsions of this invention may be further enhanced by the addition of polyalkylene glycols; however, it has been found that the addition of polyalkylene glycols reduces the number of releases per application.

Polyalkylene glycols which may be incorporated in the silicone emulsions are those having the general formula HO(R″O)$_x$H where R″ is an alkylene radical having from 1 to 4 carbon atoms, x is a number of from 1 to 300 and has a melting point in the range of from 0° to 80° C.

Suitable examples of radicals represented by R″ are methylene, ethylene, propylene, butylene radicals and mixtures thereof.

Specific examples of polyalkylene glycols are polyethylene glycol, polypropylene glycols, polybutylene glycols, poly(ethyleneoxy-propylene) glycols, poly(ethyleneoxybutylene) glycols and poly (propyleneoxybutylene) glycols.

The amount of polyalkylene glycols which may be added to the organopolysiloxane emulsions of this invention may range from about 5 to 10 percent by weight based on the organopolysiloxane emulsion and the polyalkylene glycols.

Other ingredients, which may be added to the organopolysiloxane emulsions are antifoams and preservatives, such as bactericides. The amount of antifoam will generally range from about 0 to about 1.0 percent and more preferably from about 0.2 to 0.7 percent, based on the weight of the organopolysiloxane emulsion. Generally, from about 0 to about 0.3 percent of bactericide may be employed in these emulsions. More preferably though, the amount of bactericide will range from about 0.1 to about 0.2 percent, based on the weight of the aqueous emulsion. Other additives which may be included in the aqueous emulsions of this invention are rust inhibitors such as sodium nitrite, sodium nitrate and coloring agents and the like, which can be added in minor amounts to the emulsions of this invention.

Although the aqueous silicon organopolysiloxane emulsions of this invention may be prepared by several techniques in a mechanical mixing apparatus, it is preferred that the nonionic surfactant and acid be mixed in a mechanical mixer with sufficient water to form a paste or grease-like composition. Generally, the amount of water ranges from about 10 to 25 percent of the total amount of water employed in the emulsion. After the grease or paste-like composition has been formed the lubricant is then mixed in a mechanical mixing apparatus with the paste, then the hydroxyl-terminated gum is added slowly with mixing and then the methylhydrogenpolysiloxane fluid. The remainder of the water is then added slowly with mixing until the particle size of the micelles is below 10 microns, then the antifoam and bacteriacide are added with sufficient base to increase the pH to a range of from 8 to 10. The mixture is then mixed for a period of time in order to form a prepolymer and then the thickening agent and sufficient acid is added to reduce the pH to a range of from 4 to 6. After mixing for a period of time the resultant oil in water emulsion is then filtered.

In adjusting the pH of the emulsion to a range of from 8 to 10, any basic material may be added to the mixture. Examples of suitable bases which may be employed are alkali metal hydroxides, alkaline earth metal hydroxides and ammonium hydroxide. Specific examples of alkali metal hydroxides are sodium hydroxide, potassium hydroxide. Other bases which may be employed are alkali and alkaline earth metal carbonates, such as sodium carbonate, calcium carbonate, sodium bicarbonate and sodium metasilicate as well as ammonia and ammonium hydroxide.

Examples of suitable acids which may be employed in the aqueous emulsions of this invention are inorganic as well as organic acids. Specific examples of inorganic acids which may be employed are hydrochloric acid, sulfuric acid, orthophosphoric acid, sulfuric acid. Examples of organic acids which may be employed are oxalic acid, tartaric acid, maleic acid, citric acid, formic acid, lactic acid, acetic acid, benzoic acid and boric acid.

The aqueous organopolysiloxane emulsion of this invention may be used as a bladder lubricant in manufacturing rubber tires in which a green tire is placed in a tire mold and the bladder is coated with the silicone emulsion of this invention. The mold is closed and the bladder expanded by application of internal pressure to force the tire outward against the mold surface to shape and cure the tire. The mold is then opened and the bladder collapsed and the shaped and the cured tire removed from the mold.

In addition to applying the aqueous silicone emulsions of this invention to the expandable bladder, these emulsions may be applied to the inside of a green tire carcass and then inserted in the mold.

It has been observed that when the aqueous silicone organopolysiloxane emulsions of this invention has been applied to the outer surface of an expandable bladder, that from 30 to 40 tires could be molded with one application of the emulsion. In the following examples all parts and percentages are by weight unless otherwise specified.

EXAMPLE 1

An aqueous silicone emulsion is prepared by adding 0.5 parts of glacial acetic acid to a mixer containing 58 parts of water and 56 parts of a poly(ethyleneoxide) alkyl phenol having an HLB of 15 (Igepal ® DM-730, available from General Aniline and Film Corporation) and 19 parts of a poly(ethyleneoxide) alkyl phenol having an HLB of 10.6 (Igepal ® DM-530, available from General Aniline and Film Corporation) and then mixed in a mechanical mixer to form a paste or grease. To the resultant paste is added with mixing 6.3 parts of lanolin, 450 parts of a hydroxyl-terminated organopolysiloxane gum having a plasticity value of about 50 millimeters, about 40 parts of a methylhydrogenpolysiloxane fluid having an average of at least three Si-bonded hydrogen atoms per molecule and a viscosity of about 30 mPa.s at 25° C. and about 245 parts of water. About 5.0 parts of a 10 percent silicone antifoam emulsion having a viscosity of 3000 cps at 25° C. (available as SWS-214 from SWS Silicones Corporation) and 1.5 parts of a bactericide and 1.0 part of ammonium hydroxide (28 percent ammonia in water) are added to the resultant oil-in-water emulsion. The emulsion is mixed from about 2 hours at room temperature, then about 90.0 parts of a thickening agent containing about 1.5 percent by weight, Carbopol ® A-941 containing acrylic acid polymers having a molecular weight of about 1,250,000, (available from B. F. Goodrich Chemical Company) and sufficient acetic acid are are added to the oil-in-water emulsion with mixing to provide a pH of from 4 to 6. The resultant emulsion is filtered, then diluted 1:1 with water and sprayed onto the outer surface of a bladder and the coated bladder inserted inside a green tire carcass in a mold. The mold is closed and the bladder is expanded against the inside surface of the tire, which in turn presses the outer surface of the tire against the mold. After the tire is shaped and cured, the bladder is collapsed and the tire removed therefrom. It has been observed that from 30 to 40 tires could be molded with one application of the emulsion to the flexible bladder.

EXAMPLE 2

The silicone emulsion is prepared in accordance with the procedure of Example 1, except that 600 parts of a hydroxyl-terminated organopolysiloxane gum having a plasticity value of 80 are substituted for the 450 parts of hydroxyl-terminated organopolysiloxane gum and 6 parts of a methylhydrogenpolysiloxane fluid having a viscosity of 30 mPa.s at 25° C. are substituted for the 40 parts of methylhydrogenpolysiloxane fluid and 200 parts of water are substituted for the 303 parts of water. The resultant silicone emulsion exhibits good stability and exhibits excellent release properties when applied to the bladder or the inside of a green tire carcass and then molded into a tire.

EXAMPLE 3

The procedure of Example 1 is repeated, except that 200 parts of a hydroxyl-terminated organopolysiloxane gum having a plasticity value of 80 are substituted for the 450 parts of hydroxyl-terminated organopolysiloxane gum and 6 parts of the methylhydrogenpolysiloxane fluid having a viscosity of 30 mPa.s at 25° C. are substituted for the 40 parts of methylhydrogenpolysiloxane fluid and 600 parts of water are substituted for the 303 parts of water. The resultant emulsion exhibits good stability and exhibits excellent release properties when applied to the bladder or the inside of a green tire carcass and then molded into a tire.

EXAMPLE 4

The procedure of Example 1 is repeated, except that 400 parts of a hydroxyl-terminated organopolysiloxane gum are substituted for the 450 parts of hydroxyl-terminated organopolysiloxane gum and 15 parts of methylhydrogenpolysiloxane fluid are substituted for the 40 parts of methylhydrogenpolysiloxane fluid and 381 parts of water are substituted for the 303 parts of water. The resultant emulsion exhibits good stability at room temperature and exhibits excellent release properties when applied to the bladder or the inside of a green tire carcass and then molded into a tire.

EXAMPLE 5

The procedure of Example 1 is repeated, except that 430 parts of a hydroxyl-terminated organopolysiloxane gum are substituted for 450 parts of hydroxyl-terminated organopolysiloxane gum and 20 parts of lanolin are substituted for the 6.3 parts of lanolin. The resultant emulsion exhibits good stability at room temperature and exhibits excellent release properties when applied to the bladder in the molding of a tire.

EXAMPLE 6

The procedure of Example 1 is repeated, except that 6.3 parts of spermaceti are substituted for the lanolin. The resultant emulsion exhibits good stability at room temperature and exhibits excellent release properties when applied to the bladder or the inside of a green tire carcass and then molded into a tire.

EXAMPLE 7

The procedure of Example 1 is repeated, except that 6.3 parts of a polyethylene glycol having a melting point below 80° C. are added to the composition. The resultant emulsion exhibits good lubricity and good stability at room temperature, but the number of releases is about 10 when applied to the bladder in molding tires.

EXAMPLE 8

The procedure of Example 1 is repeated, except that 450 parts of a hydroxyl-terminated organopolysiloxane gum having a plasticity value of about 120 are substituted for the hydroxylterminated organopolysiloxane gum having a plasticity value of 50. The resultant emulsion begins to "break" after a period of time.

EXAMPLE 9

The procedure of Example 1 is repeated, except that 93.3 parts of sodium carboxymethylcellulose are substituted for the Carbopol. The resultant emulsion exhibits good storage stability and excellent release properties when applied to the bladder or the inside of a green tire carcass and then molded to form a tire.

What is claimed is:

1. An aqueous organopolysiloxane emulsion comprising (1) from 20 to 70 percent by weight based on the weight of the organopolysiloxane emulsion of a hydroxyl-terminated organopolysiloxane gum having a plasticity value of from 50 to 100; (2) from 0.5 to 25 percent by weight based on the weight of the organopolysiloxane emulsion of an organohydrogenpolysiloxane fluid having a viscosity of from 10 to 100 mPa.s at 25° C. and an average of at least 3 Si-bonded hydrogen atoms per molecule; (3) from 0.05 to 5 percent by weight of a lubricant having a melting point of from 25° to 80° C., based on the weight of the organopolysiloxane emulsion; (4) from 2 to 12 percent by weight based on the weight of the organopolysiloxane emulsion of a thickening agent; (5) from 4 to 10 percent by weight based on the weight of the organopolysiloxane emulsion of a surfactant; and (6) from 15 to 60 percent based on the weight of the organopolysiloxane emulsion of water.

2. The organopolysiloxane emulsion of claim 1, wherein the organopolysiloxane emulsion contains from 0.05 to 0.3 percent by weight of a bactericide based on the weight of the organopolysiloxane emulsion.

3. The organopolysiloxane emulsion of claim 1, wherein the organopolysiloxane emulsion contains from 0.1 to 0.5 percent by weight of an antifoam based on the weight of the organopolysiloxane emulsion.

4. The organopolysiloxane emulsion of claim 1, wherein the organopolysiloxane emulsion contains from 5 to 10 percent by weight of a polyalkylene glycol based on the weight ofo the organopolysiloxane emulsion and the polyalkylene glycol.

5. The organopolysiloxane emulsion of claim 1, wherein the hydroxyl-terminated organopolysiloxane gum is a hydroxyl-terminated polydimethylsiloxane gum.

6. The organopolysiloxane emulsion of claim 1, wherein the organohydrogenpolysiloxane fluid is a methylhydrogenpolysiloxane fluid having at least 35 repeating units in the polymer chain.

7. The organopolysiloxane emulsion of claim 1, wherein the lubricant is lanolin.

8. An aqueous organopolysiloxane emulsion comprising (1) 45 percent by weight based on the weight of the organopolysiloxane emulsion of a hydroxyl-terminated organopolysiloxane gum having a plasticity value of from 50 to 100; (2) from 4 to 6 percent by weight based on the weight of the organopolysiloxane emulsion of an organohydrogenpolysiloxane fluid having a viscosity of at least 30 mPa.s at 25° C. and an average of at least three siliconbonded hydrogen atoms per molecule; (3) from 0.3 to 1 percent by weight based on the weight of the organopolysiloxane emulsion of a lubricant; (4) from 4 to 7 percent by weight based on the weight of the organopolysiloxane emulsion of a thickening agent; (5) from 6 to 9 percent by weight based on the weight of the organopolysiloxane emulsion of a surfactant; (6) from 25 to 50 percent by weight based on the weight of the organopolysiloxane emulsion of water; (7) from 0.2 to 0.4 percent by weight of an antifoam based on the weight of the organopolysiloxane emulsion; and (8) from 0.1 to 0.2 percent by weight based on the weight of the organopolysiloxane emulsion of a bactericide.

9. A process for preparing an aqueous organopolysiloxane emulsion which comprises forming a paste by mixing from 4 to 10 percent by weight of a surfactant based on the weight of the organopolysiloxane emulsion with sufficient acid to provide a pH of about 5 and about 20 percent of the total amount of water to be employed in the aqueous emulsion, adding from 0.05 to 5 percent by weight of a lubricant based on the weight of the organopolysiloxane emulsion, from 20 to 70 percent by weight based on the weight of the organopolysiloxane emulsion of a hydroxyl-terminated organopolysiloxane gum having a plasticity value of from 50 to 100 and from 0.5 to 25 percent by weight based on the weight of the organopolysiloxane emulsion of an organohydrogenpolysiloxane having a viscosity of from 30 to 100 mPa.s at 25° C., adding the remainder of the water so that the total amount of water ranges from 15 to 60 percent by weight based on the weight of the organopolysiloxane emulsion, adjusting the pH of the emulsion to a pH of from 8 to 10 by the addition of a base and after agitating for a period of time adding sufficient acid to adjust the pH in a range of from 4 to 6 and then adding from 2 to 12 percent by weight of a thickening agent based on the weight of the organopolysiloxane emulsion.

* * * * *